(12) United States Patent
Strefling et al.

(10) Patent No.: US 10,793,260 B1
(45) Date of Patent: Oct. 6, 2020

(54) METHODS AND SYSTEMS FOR CONTROLLING AIRCRAFT FLIGHT PERFORMANCE

(71) Applicant: The Boeing Company, Chicago, IL (US)

(72) Inventors: Paul C. Strefling, Seattle, WA (US); Michael D. Bills, Mountlake Terrace, WA (US); Bruce Mays Fritchman, Bainbridge Island, WA (US); John Koon-hung Ho, Shoreline, WA (US); Kioumars Najmabadi, Bellevue, WA (US); Edward E. Coleman, Lake Forest Park, WA (US); Thomas C. Ramsey, Jr., Redmond, WA (US); Steven Cook Stone, Seattle, WA (US); Paul J. Cline, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 362 days.

(21) Appl. No.: 15/797,415

(22) Filed: Oct. 30, 2017

(51) Int. Cl.
  *B64C 13/00* (2006.01)
  *B64C 13/24* (2006.01)
  (Continued)

(52) U.S. Cl.
  CPC .............. *B64C 13/24* (2013.01); *B64C 13/16* (2013.01); *B64D 43/00* (2013.01);
  (Continued)

(58) Field of Classification Search
  None
  See application file for complete search history.

(56) References Cited

U.S. PATENT DOCUMENTS

| 5,072,893 A | 12/1991 | Chakravarty et al. |
| 5,082,207 A | 1/1992 | Tulinius |

(Continued)

FOREIGN PATENT DOCUMENTS

| EP | 2465770 A2 | 6/2012 |
| EP | 2944566 A1 | 11/2015 |
| EP | 3190043 A1 | 7/2017 |

OTHER PUBLICATIONS

EP, Search Report; EP Patent Application 18197429.6, 10 pages (dated Feb. 25, 2019).

*Primary Examiner* — Truc M Do

(57) ABSTRACT

Aircraft and methods and systems for controlling performance of an aircraft. The methods and systems allow the aircraft to meet a performance requirement using a set of aircraft flight data and actuators connected to control surfaces. Performance data for primary and secondary actuators are obtained to select between a primary control law for controlling the primary control surface, a secondary control law for controlling the secondary control surface, and a blended control law that controls the primary and secondary control surfaces together. If the primary control surface cannot meet the aircraft performance requirement using the primary control law, the blended control law is implemented if the primary and secondary control surfaces can be used together to meet the performance requirement; otherwise the secondary control surface is used, using the secondary control law, to meet the aircraft performance requirement.

23 Claims, 9 Drawing Sheets

(51) Int. Cl.
  *B64C 13/16* (2006.01)
  *B64D 43/00* (2006.01)
  *G07C 5/08* (2006.01)
  *G05D 1/08* (2006.01)
  *B64D 45/00* (2006.01)
  *B64C 19/00* (2006.01)

(52) U.S. Cl.
  CPC ....... *B64D 45/0005* (2013.01); *G05D 1/0816* (2013.01); *G07C 5/0816* (2013.01); *B64C 19/00* (2013.01)

(56) References Cited

U.S. PATENT DOCUMENTS

| | | | |
|---|---|---|---|
| 6,236,914 B1* | 5/2001 | Kaloust | G05D 1/0816 244/76 R |
| 2007/0007385 A1* | 1/2007 | Potter | B64C 13/505 244/53 R |
| 2009/0018703 A1 | 1/2009 | Mangalam et al. | |
| 2012/0018578 A1* | 1/2012 | Polcuch | H02P 8/40 244/99.2 |
| 2012/0253558 A1* | 10/2012 | Christensen | G05D 1/0858 701/3 |
| 2012/0290153 A1* | 11/2012 | Olsoe | B64C 13/505 701/3 |
| 2012/0298806 A1* | 11/2012 | Yamasaki | B64D 31/06 244/195 |
| 2013/0311006 A1* | 11/2013 | Ahmad | B64C 13/505 701/3 |
| 2014/0231591 A1* | 8/2014 | Higuchi | G05D 1/0858 244/175 |
| 2014/0288731 A1* | 9/2014 | Hagerott | B64C 9/04 701/3 |
| 2015/0021443 A1* | 1/2015 | Wildschek | G05D 1/0066 244/76 C |
| 2015/0081139 A1* | 3/2015 | Beggiora | G06F 3/016 701/3 |
| 2016/0023776 A1* | 1/2016 | Ganguli | B64D 43/02 701/14 |
| 2016/0229521 A1* | 8/2016 | De Miranda Car | B64C 27/56 |
| 2017/0160749 A1* | 6/2017 | Torralba | B64C 13/18 |
| 2017/0190410 A1* | 7/2017 | Good | B64C 3/56 |
| 2019/0047683 A1* | 2/2019 | De Souza | B64C 13/503 |

* cited by examiner

METHODS AND SYSTEMS FOR CONTROLLING AIRCRAFT FLIGHT PERFORMANCE

FIELD

The disclosed system and method relate to methods and systems for controlling aircraft flight performance and, more particularly, to methods and systems for meeting performance requirements of an aircraft using primary control surfaces and secondary control surfaces of the aircraft.

BACKGROUND

Control surfaces of an aircraft are generally operated by actuators during aircraft flight. The control surfaces of an aircraft may be permanently jammed due to hydraulic or mechanical problems. Alternatively, the control surface may be temporarily immovable or have limited mobility during a blow-down limit condition. A blow-down limit occurs when aerodynamic constraints cause an actuator to become immobile or limit actuator mobility so that the associated control surface cannot meet flight performance requirements, and may occur during a particular maneuver. Once the aerodynamic forces are restored to their normal values, the blow-down limit phase ends and the actuator and associated control surfaces are able to move normally. During a blow-down phase, however, the immobility of a control surface may affect the quality of the flight of the aircraft, causing undesirable effects such as shaking of the aircraft.

During flight of an aircraft, it may be desirable or even required that the effects of a blow-down phase be minimized or eliminated to provide adequate actuation for critical control laws such as modal suppression processes. It may not be possible in all circumstances to meet the performance requirements of an aircraft solely by primary control surfaces of the aircraft, such as elevators and rudders. There is thus a need for improved methods for meeting aircraft performance requirements while primary control surfaces are in a blow-down limit condition or are otherwise impaired.

SUMMARY

Embodiments of the invention disclosed herein provide improved methods and systems for meeting aircraft performance, and provide aircraft implementing improved methods and systems that meet performance requirements. The technical effects and benefits of the disclosed invention allow an aircraft to meet performance requirements even in blow-down conditions. Electronic control systems of aircraft generally may use a primary or main control law to control a main control surface of an aircraft in flight; the control law may be commands, algorithms, formulas, and so on that control operation of the control surface. During a blow-down condition for a main control surface, it may not be possible to use the main control law to control the main control surface and meet one or more performance requirements of the aircraft. In embodiments of the invention disclosed herein, if a main control surface of an aircraft cannot be used independently to meet a performance requirement of the aircraft, an alternate control surface may either be used in conjunction with the main control surface or instead of the main control surface to meet the performance requirement. If the alternate control surface is to be used independently and instead of the main control surface, an alternate control law is implemented for control of the alternate control surface. If the alternate control surface and main control surface can be used together to meet the performance requirement, then a blended control law, as disclosed herein, is used to control the alternate and main control surfaces together.

In one example, a method for controlling performance of an aircraft is disclosed. An aircraft performance requirement is obtained from an electronic control system of the aircraft, and a set of aircraft flight data is obtained from one or more sensors of the aircraft. Main actuator performance data and alternate actuator performance data are obtained, respectively, from a main actuator and an alternate actuator. The main actuator is connected to and controls a main control surface of the aircraft, while the alternate actuator is connected to and controls an alternate control surface of the aircraft. A main control law for controlling the main actuator, an alternate control law for controlling the alternate actuator, and a blended control law for controlling the main actuator and the alternate actuator together are obtained from the electronic control system. The primary control law is implemented if, based on the main actuator performance data and the set of aircraft flight data, the main control surface can independently be used to meet the aircraft performance requirement. The blended control law is implemented if the main control surface cannot independently be used to meet the aircraft performance requirement and if, based on the aircraft flight data and the alternate actuator performance data, the alternate control surface can be used in conjunction with the main control surface. If the main control surface cannot independently be used to meet the aircraft performance requirement, and the alternate control surface cannot be used in conjunction with the main control surface, the alternate control law is implemented if the alternate control surface can be independently used to meet the aircraft performance requirement.

In another example, a system for controlling performance of an aircraft is disclosed. The system includes one or more sensors capable of collecting a set of aircraft flight data, a main control surface of the aircraft connected to and controlled by a main actuator, an alternate control surface of the aircraft connected to and controlled by an alternate actuator, and an electronic control system. The electronic control system includes one or more processors operatively connected to the one or more sensors, the main actuator, and the alternate actuator, a database operatively connected to the processor, and a memory operatively connected to the one or more processors and the database, the memory storing data comprising program code for execution by the one or more processors to perform a method for controlling performance of an aircraft. The method includes obtaining an aircraft performance requirement from the database of the electronic control system, and obtaining a set of aircraft flight data from the one or more sensors. Main actuator performance data and alternate actuator performance data are obtained, respectively, from the main actuator and the alternate actuator. A main control law for controlling the main actuator, an alternate control law for controlling the alternate actuator, and a blended control law for controlling the main actuator and the alternate actuator together are obtained from the database of the electronic control system. The main control law is implemented if, based on the main actuator performance data and the aircraft flight data, the main control surface can independently be used to meet the aircraft performance requirement. The blended control law is implemented if the main control surface cannot independently be used to meet the aircraft performance requirement and if, based on the aircraft flight data and the alternate actuator performance data, the alternate control surface can be used in conjunction with the main control surface. If the main control surface cannot independently be used to meet the aircraft performance requirement, and the alternate control surface cannot be used in conjunction with the main control surface, the alternate control law is implemented if the alternate control surface can be independently used to meet the aircraft performance requirement.

Other objects and advantages of the disclosed method and system will be apparent from the following description, the accompanying drawings and the appended claims.

DETAILED DESCRIPTION

Figure 1:
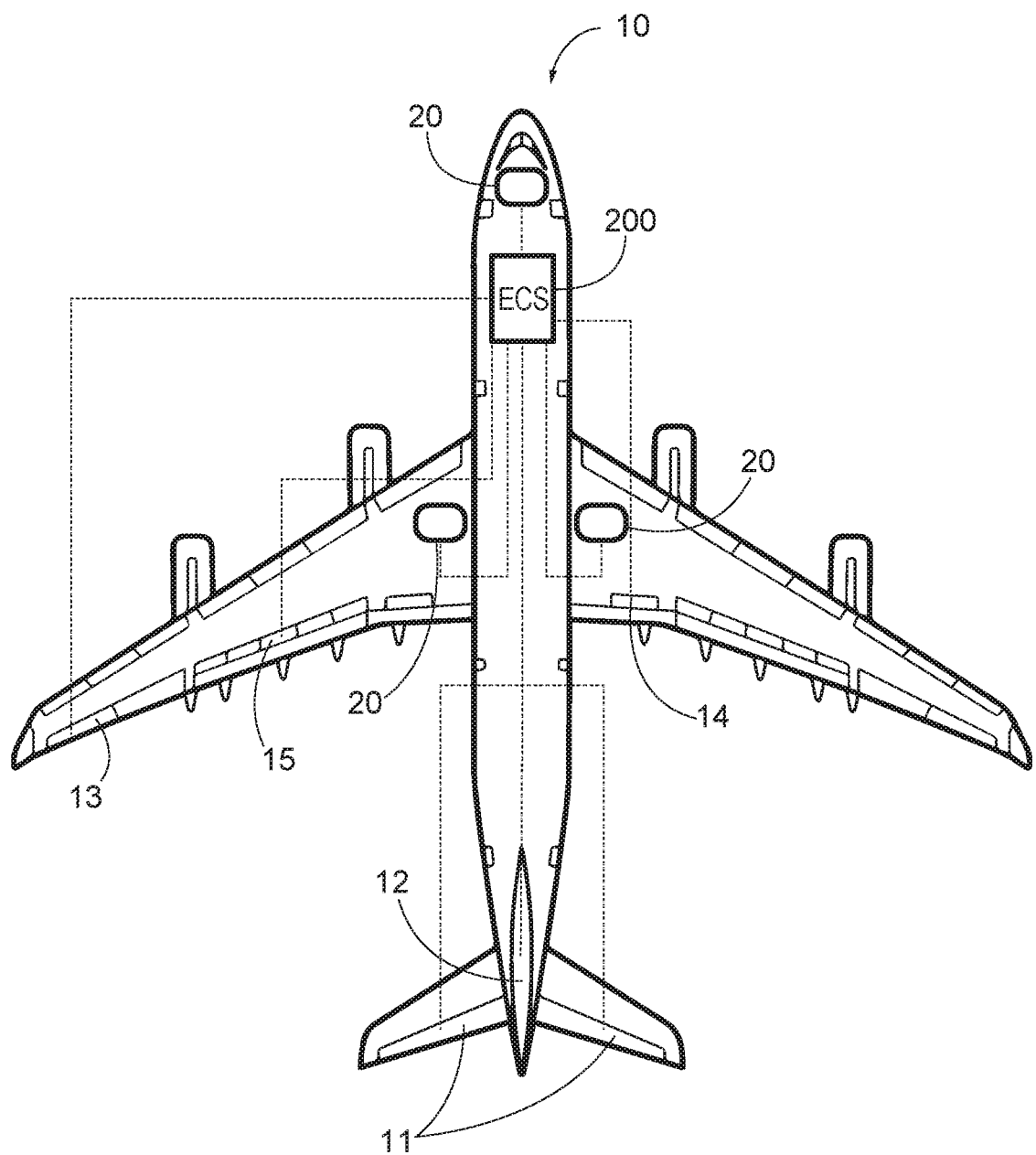
FIG. 1 is an exemplary schematic block diagram of an aircraft including the disclosed system for controlling an aircraft.

FIG. 1 is an exemplary schematic block diagram of an aircraft 10 including a system for controlling performance of the aircraft, as described below. An aircraft 10 may be any aircraft, such as a fixed wing aircraft, a rotary wing aircraft, a propeller drive aircraft, a jet propelled aircraft, a commercial airplane, a military aircraft, or another type of aircraft or any aircraft that may be a combination of different types of aircraft, such as the fixed-wing commercial airplane depicted in the example of FIG. 1. An aircraft 10 may generally include primary control surfaces such as one or more elevators 11, a rudder 12, and one or more ailerons 13. Each primary control surface is connected to a corresponding primary actuator (not depicted in FIG. 1) that controls the respective primary control surface. A primary actuator for a rudder may the rudder to rotate to change its angle relative to the aircraft, while a primary actuator for an aileron may extend, retract, and alter an angle of the aileron relative to the aircraft. As well, the aircraft 10 may include one or more secondary control surfaces such as flaps 14 and spoilers 15, as well as other secondary control surfaces such as slats, slots, brakes, and so on. While most aircraft have at least one secondary control surface, different aircraft may not include certain secondary control surfaces included on other aircraft. The example secondary control surfaces depicted in FIG. 1 are illustrated by way of example only and not by limitation. Each secondary control surface is connected to a corresponding secondary actuator (not depicted in FIG. 1) that controls the respective secondary control surface.

A main control surface of the aircraft, as referenced herein, is any primary or secondary control surface that is the main surface used for a particular aircraft maneuver or operation. Similarly, an alternate control surface, as referenced herein, is any primary or secondary control surface that may be used in the alternative to the main surface, or in conjunction with the main surface, to perform a particular aircraft maneuver or operation. For example, ailerons are generally considered a "primary control surface" that may be the main control surfaces for controlling the roll of the aircraft, but may also be alternate control surfaces for maneuvers primarily controlled by the aircraft elevators. Similarly, spoilers are generally defined as secondary control surfaces, and may be used as alternate control surfaces in conjunction with other control surfaces for various flight maneuvers, but also act as a main control surface during landing of an aircraft.

Aircraft 10 also includes one or more sensors 20 that detect or measure flight data related to the aircraft in flight, such as an airspeed of the aircraft, an altitude of the aircraft, an orientation of the aircraft, a degree of freedom of the aircraft, an acceleration of the aircraft, and so on. An orientation of the aircraft may be, for example, an angle of attack of the aircraft relative to the oncoming air mass, an orientation of the aircraft relative to an external beacon, and so on. A degree of freedom may be any one or more of a pitch, yaw, and roll of the aircraft, and/or a coordinate position of the aircraft in a three-dimensional coordinate system. The example sensors 20 shown in FIG. 1 are depicted by way of example only. Sensors 20 may be located anywhere on aircraft 10 as appropriate, and need not be located as shown in FIG. 1 nor limited to a particular number of sensors.

Aircraft 10 also includes an electronic control system 200, as further described below and illustrated in FIG. 7. The electronic control system is operatively connected to sensors 20 to obtain aircraft flight data from the sensors 20, and is operatively connected to the primary actuators and secondary actuators of primary control surfaces 11, 12, 13 and secondary control surfaces 14, 15. As described further below, the electronic control system 200 includes computer program code for performing a method 100, described below and depicted in FIGS. 2-6, for controlling performance of the aircraft. The electronic control system is capable of controlling the primary actuators to control and move primary control surfaces 11, 12, 13 as well as controlling the secondary actuators to control and move secondary control surfaces 14, 15. As described above, any of primary surfaces 11, 12, 13 and secondary control surfaces 14, 15 may be a main control surface as defined herein for a particular aircraft operation, and any of primary surfaces 11, 12, 13 and secondary control surfaces 14, 15 may be an alternate control surfaces as defined herein for a particular aircraft operation.

Figure 2:
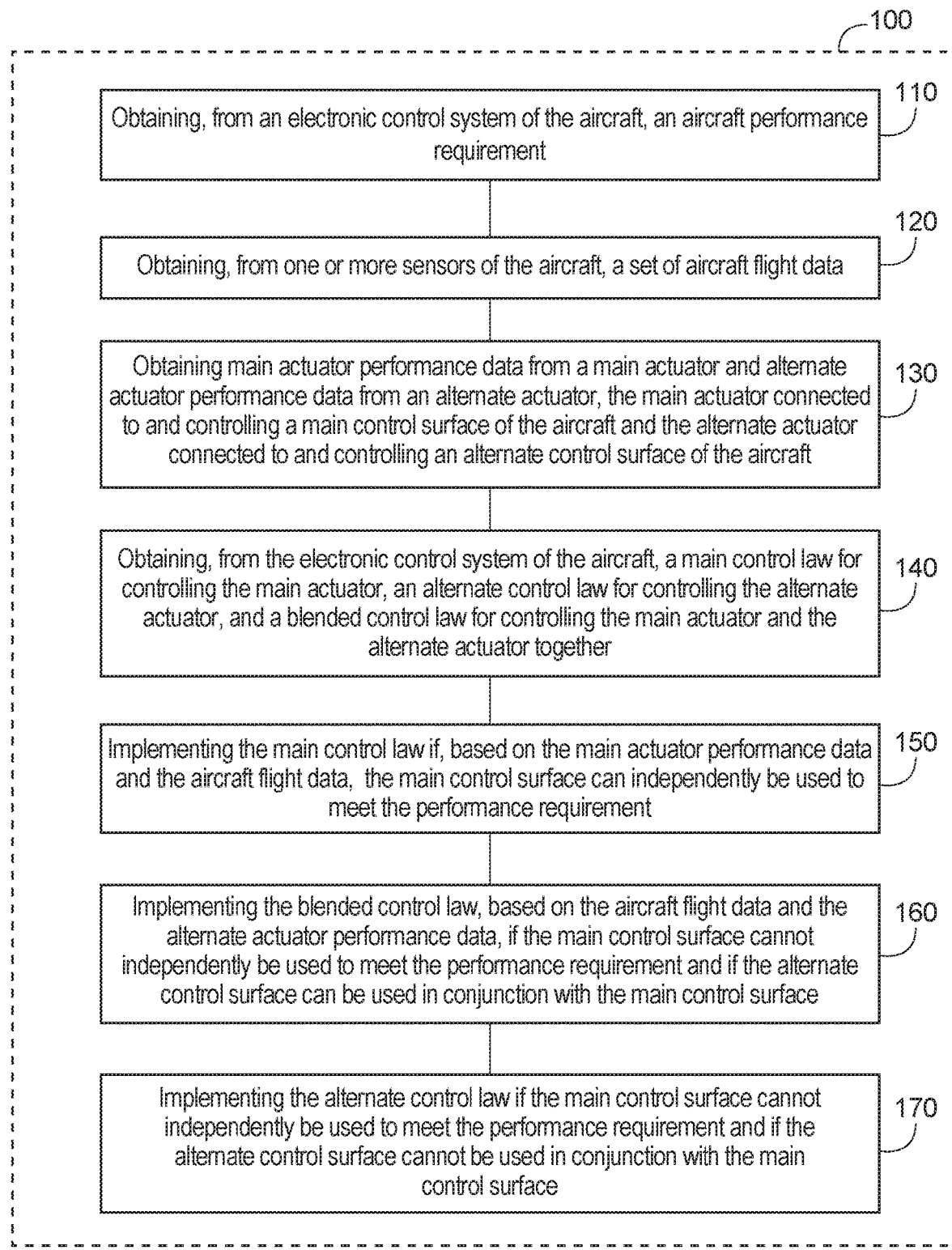
FIG. 2 is an exemplary process flow diagram of an embodiment of the disclosed method.

FIG. 2 is an exemplary process flow diagram illustrating one method 100 for controlling performance of an aircraft such as exemplary aircraft 10 in FIG. 1. The method 100 generally begins at block 110 with obtaining an aircraft performance requirement for the aircraft. The aircraft performance requirement may be obtained from an electronic control system of the aircraft, as further described below. An aircraft performance requirement may be any requirement related to aircraft performance, such as stability requirements, acceleration or airspeed limits in particular flight conditions, ride quality requirements, and so on. A performance requirement may be generally expressed as a rule, an algorithm, a mathematical formula, a set of physical limits or constraints, or a combination or in other ways of expressing performance requirements. For example, as expressed in FAA regulation FAR § 25.629, one performance requirement is that an airplane must be free from aeroelastic instability for all configurations and design conditions within a normal flight envelope. Another example of a performance requirement might mandate than the aircraft achieve a pitch acceleration of X degrees per second squared, where X is a particular value set according to the aircraft design.

Continuing the process of FIG. 2, at block 120, a set of aircraft flight data is obtained from one or more sensors of the aircraft. Sensors of the aircraft may be configured to detect or measure flight data related to the aircraft in flight, such as an airspeed of the aircraft, turbulence, wind speeds external to the aircraft, an altitude of the aircraft, an orientation of the aircraft, and acceleration of the aircraft, or any other degree of freedom of the aircraft. An orientation of the aircraft may be, for example, an angle of attack of the aircraft relative to an oncoming air mass, an orientation of the aircraft relative to an external beacon, and so on. A degree of freedom may be any one or more of a pitch, yaw, and roll of the aircraft, and/or a coordinate position of the aircraft in a three-dimensional coordinate system. Flight data may also include, but is not limited to, a rate of change in the pitch, yaw, or roll of the aircraft, as well as speeds and/or accelerations of the aircraft relative to the ground as well as relative to the aircraft body itself.

The method 100 continues at block 130 with obtaining main actuator performance data from a main actuator of the aircraft and alternate actuator performance data from an alternate actuator of the aircraft. The main actuator is connected to and controls a main control surface of the aircraft. The alternate actuator is connected to and controls an alternate control surface of the aircraft. At block 140, a main control law for controlling the main actuator and a alternate control law for controlling the alternate actuator are obtained from the electronic control system of the aircraft. As well at block 140, a blended control law is obtained from the electronic control system. The blended control law is capable of controlling both the main control surface and the alternate control surface together. Each of the main control law, alternate control law, and blended control law may be, for example, an algorithm or mathematical formula that controls and directs motion of one or both of the main actuator and alternate actuator, and consequently motion of one or both of the main control surface and alternate control surface, to control the performance of the aircraft to meet the aircraft performance requirement.

Referring again to FIG. 2, the method 100 continues at block 150 where the main control law is implemented if it is determined that the main control surface can independently be used to meet the aircraft performance requirement. The determination is made based on the main actuator performance data obtained at block 130 and the aircraft flight data. If the main control surface cannot be used independently to meet the aircraft performance requirement, the method continues at block 160 where the blended control law is implemented if the main control surface and alternate control surface can be used in conjunction to meet the aircraft performance requirement. This determination is made based, at least in part, on the alternate performance data and the aircraft flight data. If the main control surface and alternate control surface cannot be used in conjunction, then the method continues at block 170 with implementation of the alternate control law if the alternate control surface can be used to independently meet the aircraft performance requirement. As a result of method 100, one of the main control law, alternate control law, or blended control law is implemented, and the corresponding main and/or alternate control surface is used to meet the aircraft performance requirement.

Method 100 may be carried out by an electronic control system 200, as described below, repeatedly and continually "on the fly" during flight of an aircraft 10, as aircraft flight data and performance data will almost always be in a state of flux as the aircraft is in flight. As illustrated, method 100 is applicable to one main control surface and one alternate control surface of an aircraft, and one particular airplane performance requirement. However, it will be apparent that multiple instances of method 100 may be carried out simultaneously or asynchronously on one or several electronic control systems of an aircraft in order to meet a single or multiple airplane performance requirements of an aircraft in flight.

Figure 3:
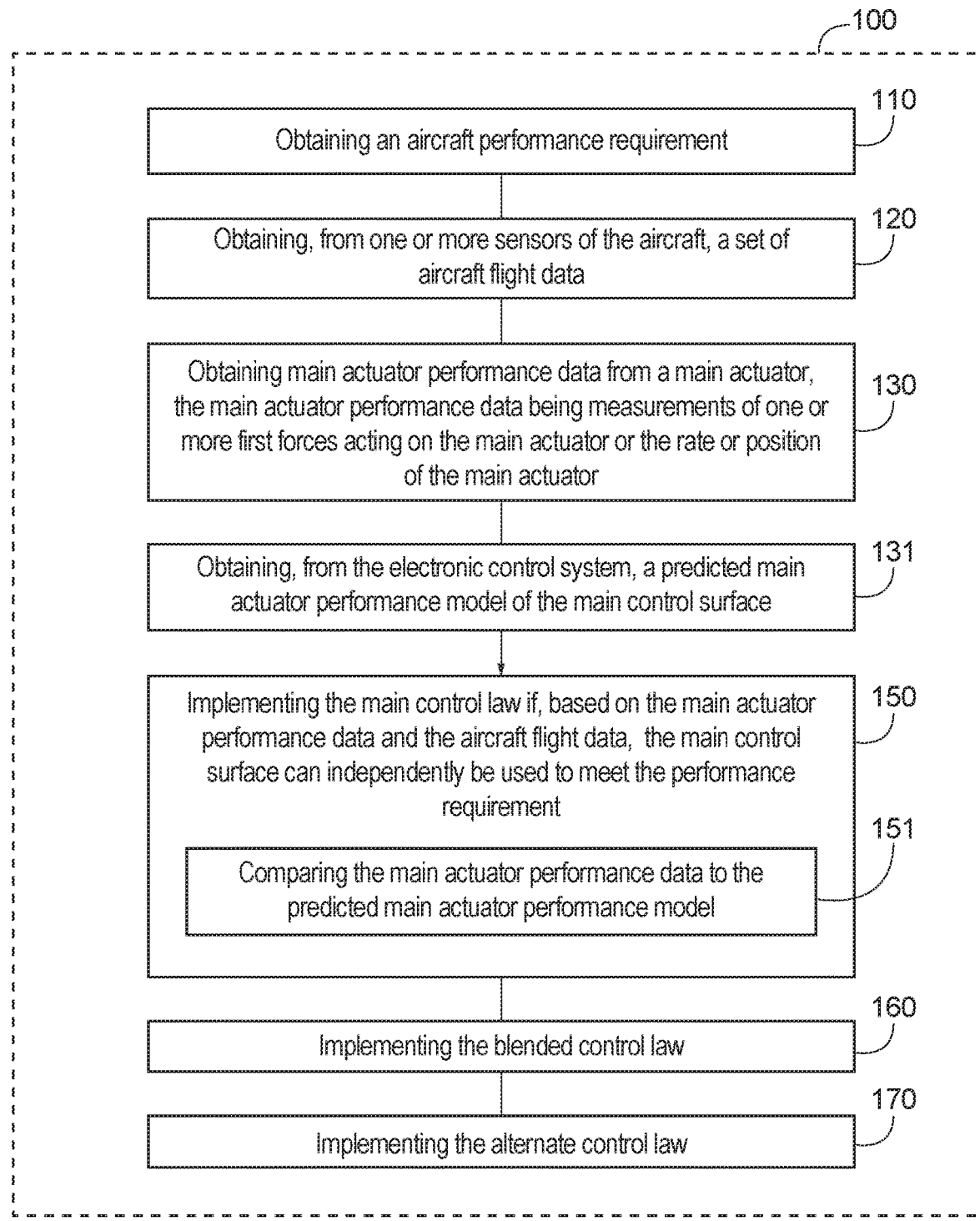
FIG. 3 is a process flow diagram of a further embodiment of the process of FIG. 2.

Turning to FIG. 3, in one example embodiment, the main actuator performance data includes a measurement or measurements, whether direct measurements or estimated measurements based on other direct measurements, of forces acting on the main actuator or the rate or position of the main actuator. These measurements may be of one or more of the following: actuator position, actuator rate, actuator hinge moment magnitude, actuator force magnitude, an actuation force rate, and measurements of other types of forces or moments acting on the main actuator. Additionally, estimated measurements may be obtained via another direct measurement. For example, the airspeed or Mach of an aircraft may be directly measured by sensors of the aircraft, and forces acting on a main actuator may be estimated based on the airspeed or Mach measurement. Estimated measurements may, in one instance, be obtained from a reference or look-up table. In another instance, estimated measurements may be determined by a mathematical formula or algorithm. As illustrated in FIG. 3, the method 100 may further include, at block 131, obtaining a predicted main actuator performance model of the main actuator and/or main control surface from the electronic control system. The predicted main actuator performance model may generally be data in any format that models threshold performance limits or values for a main actuator and/or main control surface given a particular set or subset of aircraft flight data. For example, for an airspeed of the aircraft (as obtained from an airspeed sensor of the aircraft), a predicted main actuator performance model for an elevator may provide a limit to an angle at which the elevator may be rotated or extended, beyond which the performance of the aircraft may degrade, for example, or beyond which the elevator may be damaged. The implementing of the main control law 150 may then include, at block 151, comparing the main actuator performance data to the predicted main actuator performance model.

Figure 3A:
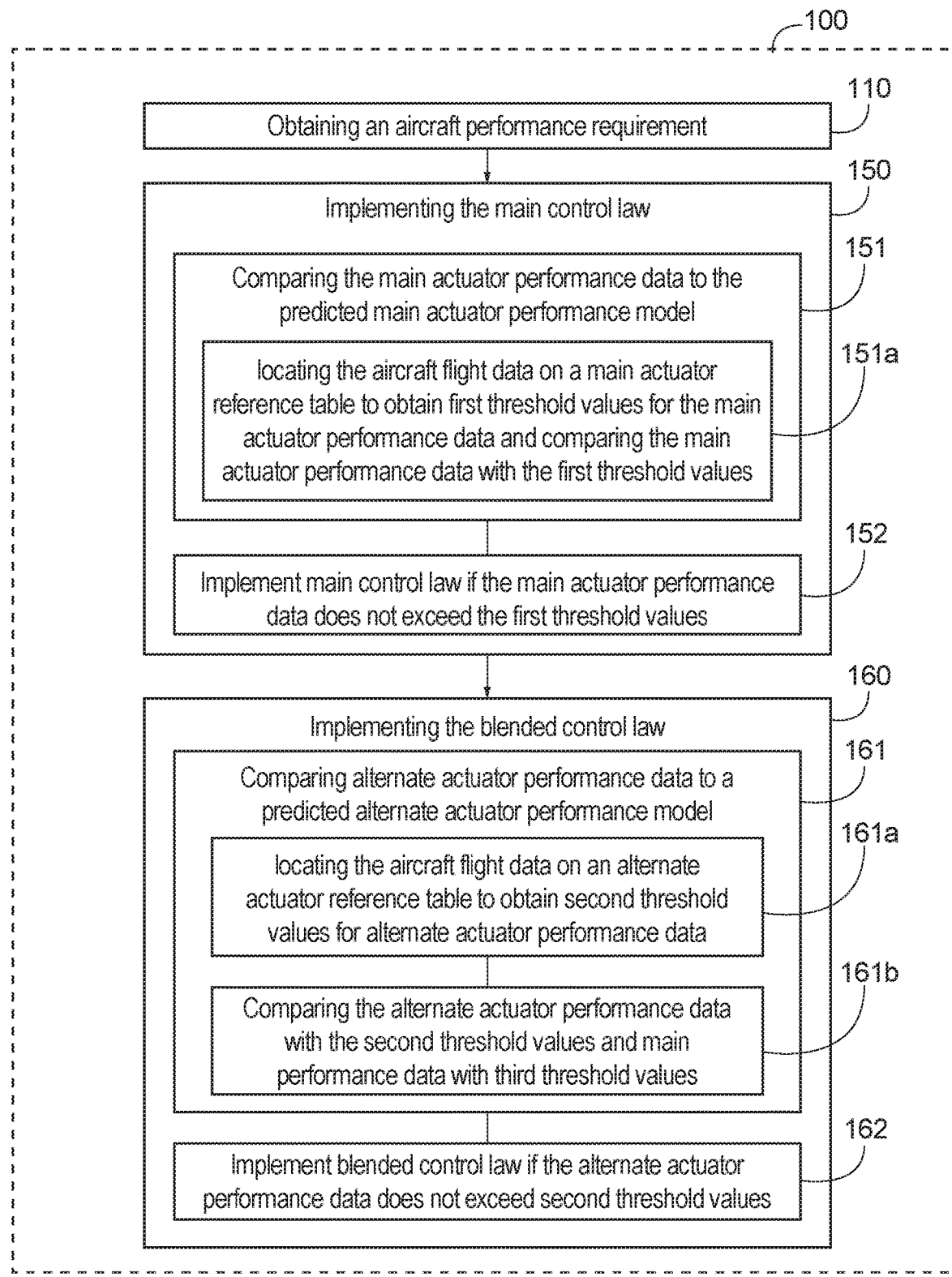
FIG. 3A is a process flow diagram of a further embodiment of the process of FIG. 3.

Turning to FIG. 3A, the predicted main actuator performance model may, in one exemplary embodiment, include a main actuator reference table. The main actuator reference table may correlate aircraft flight data or a subset of aircraft flight data with threshold values or limits for the main actuator performance data. Continuing the example above, one example of a main actuator reference table may be a main reference table that correlates, for instance, airspeed of the aircraft (a subset of aircraft flight data) to a maximum angle of extension for an elevator of the aircraft, where the angle of extension of the elevator needed to meet the performance requirement is the main actuator performance data. At block 151, comparing the main actuator performance data to the main actuator predicted performance model includes, at block 151a locating the aircraft flight data on the main reference table to obtain threshold values for the main performance table, and comparing the threshold values to the main actuator performance data previously obtained. The main control law is then implemented, at block 152, if the main actuator performance data does not exceed the threshold values. Continuing the example above, in one instance the airspeed of the aircraft may be measured to have a value, and that value is located on the main reference table. The corresponding maximum angle of extension for the elevator for that measured airspeed is obtained from the main reference table. For example, at an airspeed of Mach 0.6, the maximum angle for the elevator may be 20 degrees from normal, while at an airspeed of Mach 0.9 the maximum angle for the elevator may be only 5 degrees from normal. In this example, the elevator may be able to meet the performance requirement only if it can be rotated to an angle of 15 degrees or greater; thus, if the airspeed of the aircraft is Mach 0.6 or less, then the elevator or main control surface can independently meet the performance requirement of the aircraft, and the main control law associated with the elevator may be used to control the performance of the aircraft. However, if the airspeed of the aircraft is Mach 0.9, then the elevator cannot be rotated to the required angle to meet the performance requirement, and cannot be used independently to meet the performance requirement. Any number of predicted main performance models may exist for any particular main control surface as individual main reference tables, wherein any one or more sets or subsets of the aircraft data are correlated to threshold values of performance for the main control surface.

Continuing with FIG. 3A, the alternate performance data may also include measurements, whether direct measurements or estimated measurements as described above, of one or more forces acting on the alternate actuator or the rate or position of the alternate actuator, and the method 100 may further include obtaining, from the electronic control system, a predicted alternate actuator performance model of the alternate actuator control surface, where the predicted alternate actuator performance model includes an alternate actuator reference table. The alternate actuator reference table, similar to the main actuator reference table, may correlate threshold values for the alternate actuator performance data with a set or subset of the aircraft flight data, The blended control law, at block 160 of method 100, may include, at block 161, comparing the alternate actuator performance data to the predicted alternate actuator performance model be implemented after comparing the alternate actuator performance data and the main actuator. The comparison may include, at block 161*a*, locating the aircraft flight data on an alternate actuator reference table to obtain second threshold values for alternate actuator performance data, and at block 161*b*, comparing the alternate actuator performance data with the second threshold values and main actuator performance data with third threshold values. At block 162, if the alternate performance data does not exceed the threshold values, then the blended control law is implemented.

Figure 4:
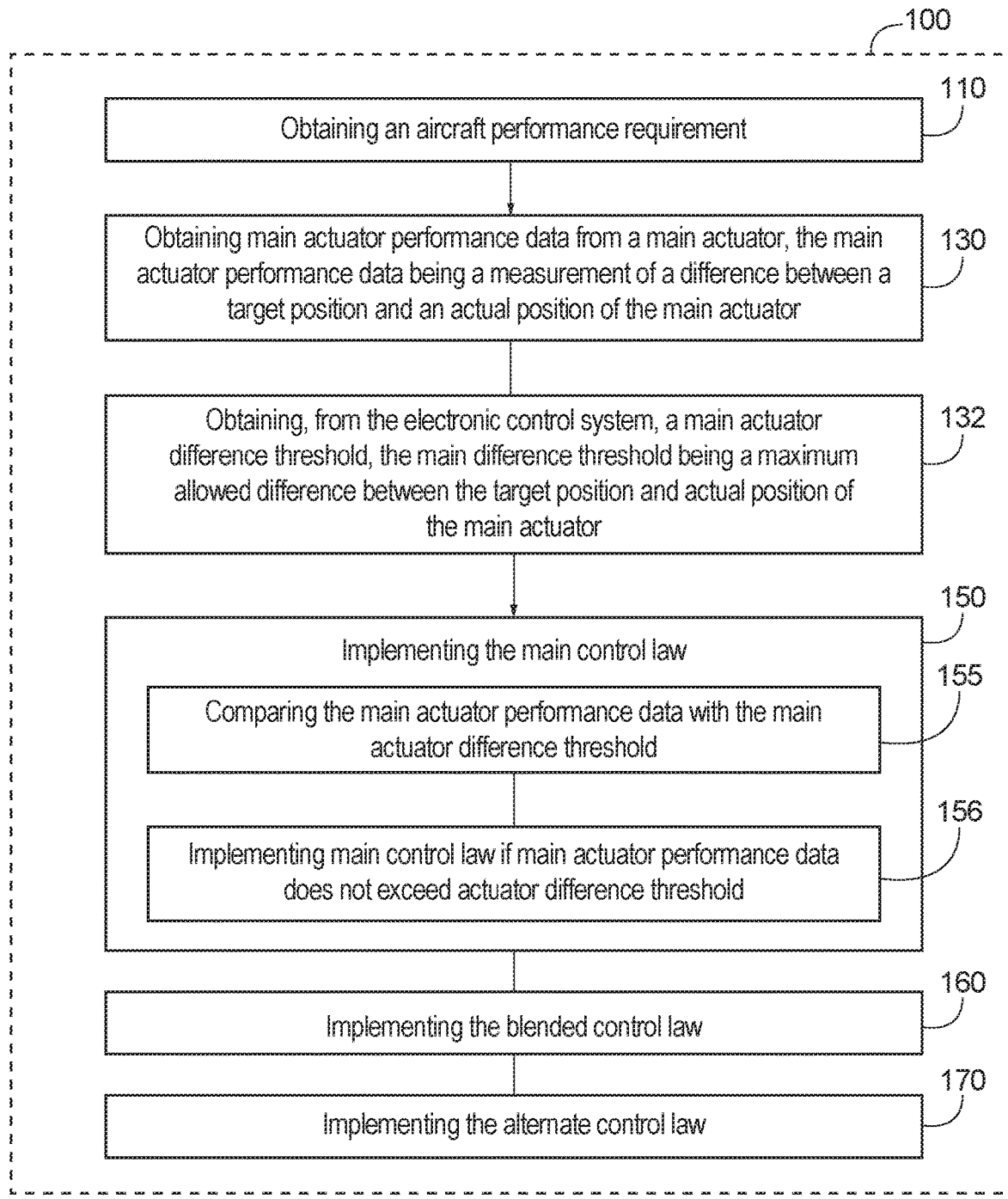
FIG. 4 is a process flow diagram of a further embodiment of the process of FIG. 2.

Turning next to FIG. 4, in another embodiment of method 100, the main actuator performance data includes a measurement of a difference between a target position and an actual position of the main actuator. The method 100 may then further include, at block 132, obtaining, from the electronic control system, a main actuator difference threshold defined as a maximum allowed difference between the target position and actual position of the main actuator. At block 155, the main actuator performance data is compared to the main actuator difference threshold. At block 156, the main control law is implemented if it is determined that the main actuator performance data does not equal or exceed the main actuator difference threshold. For example, a main actuator may control a rudder of an aircraft 10. For a given set of aircraft flight data a target position of the rudder may be defined, such as by a main actuator reference table; the main actuator performance data, in this example, would include a measurement between the defined target position of the rudder actuator and the actual current position of the rudder actuator. If this measurement of the difference between the target position and actual position of the rudder actuator is within a maximum allowed difference for the rudder actuator, as obtained from the electronic control system, then the main control law can be used as the rudder can independently meet the performance requirement of the aircraft.

Figure 4A:
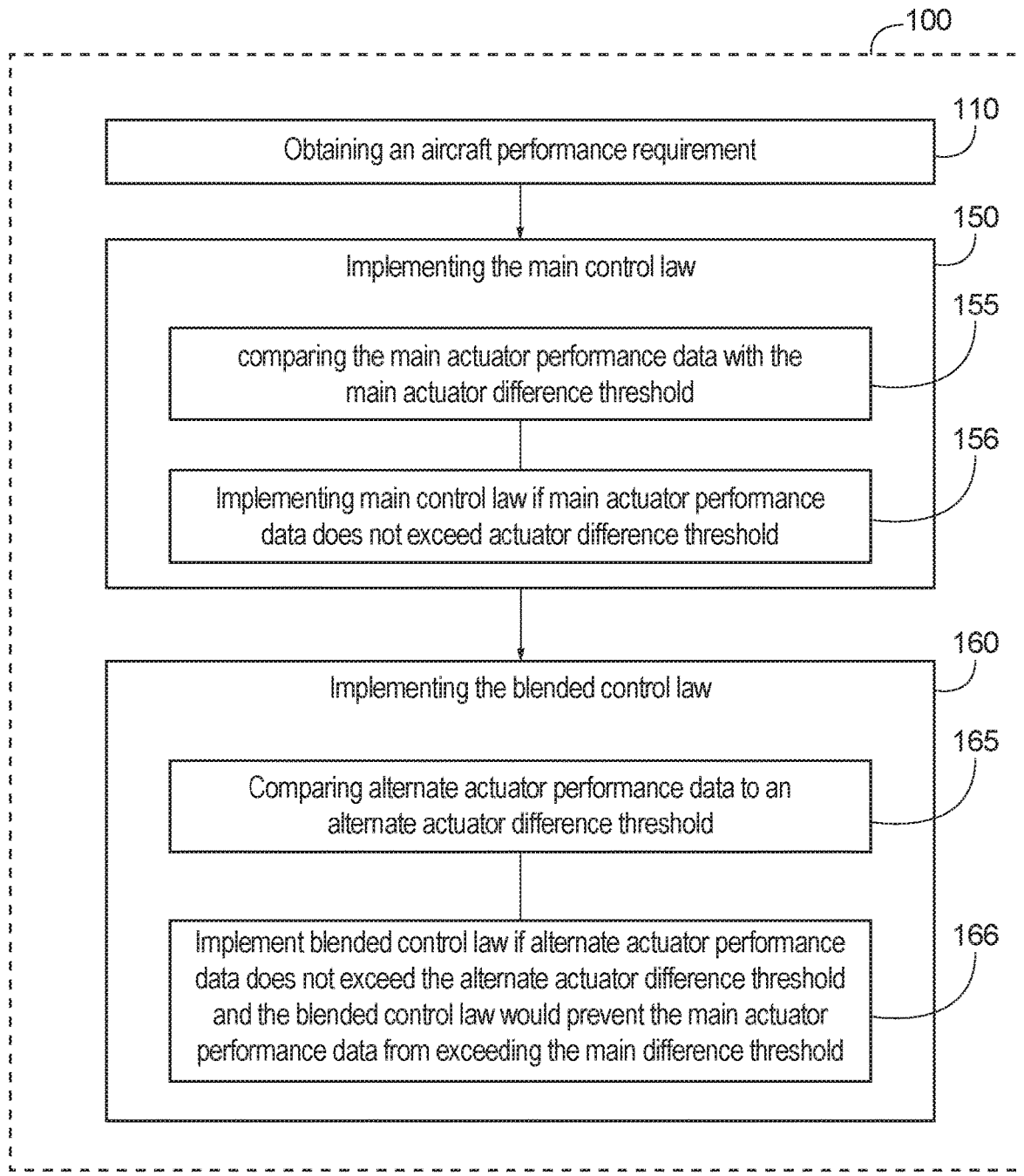
FIG. 4A is a process flow diagram of a further embodiment of the process of FIG. 4.

Referencing FIG. 4A, in embodiments where the main actuator performance data includes a measurement of a difference between a target position and an actual position of the main actuator, the alternate actuator performance data may include a measurement of a difference between a target position and an actual position of the alternate actuator for the alternate control surface. The method 100 may then further include obtaining, from the electronic control system, an alternate actuator difference threshold that is a maximum allowed difference between the target position and actual position of the alternate actuator. At block 160, implementing the blended control law includes, at block 165, comparing the alternate actuator performance data to the alternate actuator difference threshold. At block 166, the blended control law is implemented if it is determined that the alternate actuator performance data does not exceed the alternate actuator difference threshold and if using the blended control law would prevent the main actuator performance data from exceeding the main actuator difference threshold.

Figure 5:
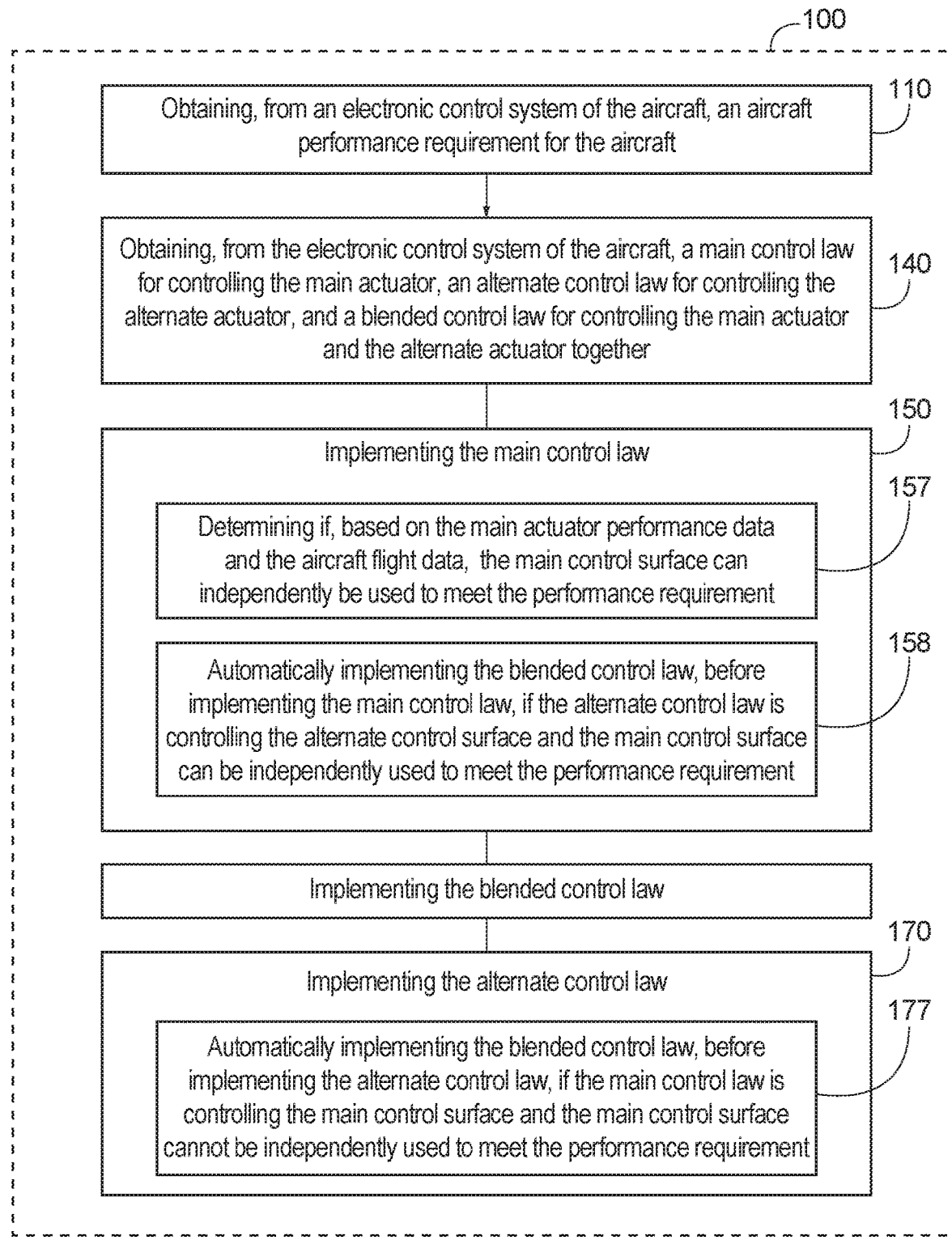
FIG. 5 is a process flow diagram of a further embodiment of the process of FIG. 2.

FIG. 5 is a block diagram of a further embodiment of the method 100 where the method further includes, at block 157, first determining that the main control surface can be used independently to meet the performance control requirement, and at block 158 automatically implementing the blended control law before implementing the main control law if the alternate control law is controlling the alternate control surface. The method 100 further includes, as part of implementing the alternate control law at block 170, at block 177 automatically implementing the blended control law before implementing the alternate control law if the main control law is controlling the main control surface and the main control surface cannot be independently used to meet the performance requirement. As described above, method 100 may be performed repeatedly and continually to assess what main or alternate control surfaces, and thus what control law, can be used to meet a performance requirement of the aircraft. Thus, it is possible for a main control surface to be used at one moment, and for an alternate control surface to be used at a later moment due to changing conditions of the aircraft, and later for control to revert to the main control surface as conditions change again. Generally, it may be desirable to provide for a smooth transition from use of the alternate control law and alternate control surface to use of the main control surface and main control law by first using the blended control law to control both the main and alternate control surfaces to control performance of the aircraft, and subsequently switching to use of the main control surface independently, rather than immediately switching from use of the alternate control surface to use of the main control surface. Similarly, it may be desirable to transition from use of the main control law and main control surface to use of the alternate control surface and alternate control law by first using the blended control law to control both the main and alternate control surfaces to control performance of the aircraft, and subsequently switching to use of the alternate control surface independently, rather than immediately switching from use of the main control surface to use of the alternate control surface.

Figure 6:
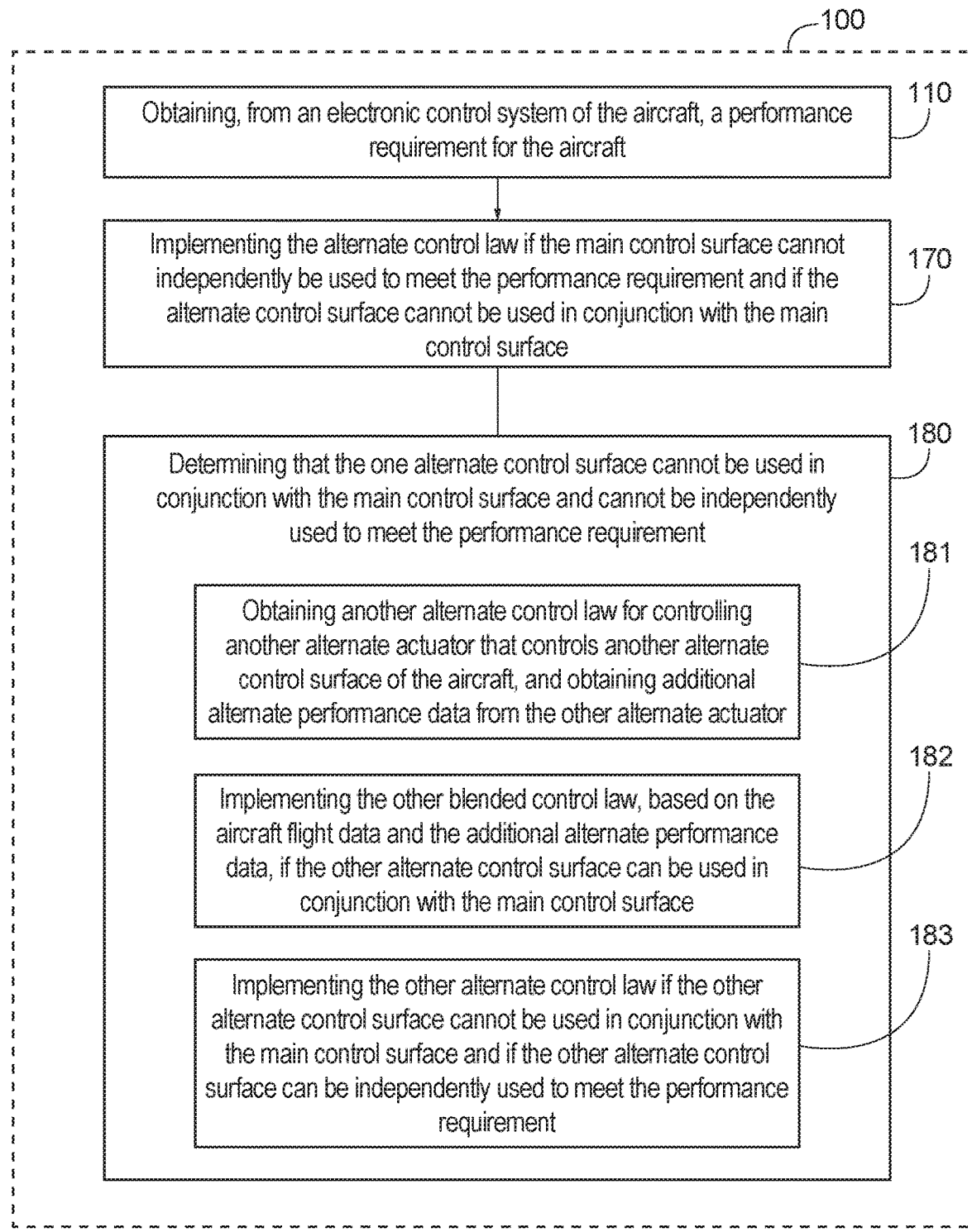
FIG. 6 is a process flow diagram of another further embodiment of the process of FIG. 2.

FIG. 6 is a block diagram of yet another further embodiment of method 100 in which another alternate control surface, and thus another alternate control law and another blended control law, may be evaluated for controlling performance of the aircraft. In the embodiment depicted in FIG. 6, the alternate control surface is one alternate control surface of a plurality of alternate control surfaces, the alternate actuator is one alternate actuator of a plurality of alternate actuators, the alternate control law is one alternate control law of a plurality of alternate control laws, and the blended control law is one blended control law of a plurality of blended control laws. The method then further includes, at block 180, determining that the one alternate control surface cannot be used in conjunction with the main control surface and cannot be independently used to meet the aircraft performance requirement. At block 181, the method 100 continues by obtaining another alternate control law for controlling another alternate actuator that controls another alternate control surface of the aircraft and obtaining additional alternate actuator performance data from the other alternate actuator. At block 182, the other blended control law is implemented if, based on the aircraft flight data and the additional alternate actuator performance data, it is determined that the other alternate control surface can be used in conjunction with the main control surface. At block 183, if it is determined that the other alternate control surface cannot be used in conjunction with the main control surface and if the other alternate control surface can be independently used to meet the aircraft performance requirement, then the other alternate control law is used to meet the aircraft performance requirement.

For example, it may be determined, via any of the embodiments of method 100 described herein, that a main surface such as the aircraft rudder cannot be used independently to meet a performance requirement of the aircraft, and further determined that a particular flap of the aircraft cannot be used together with the rudder under a blended control law to meet the aircraft performance requirement, nor can the particular flap be used independently to meet the aircraft performance requirement. It may thus be necessary to evaluate other alternate control surfaces, such as slats or spoilers or other flaps located elsewhere on the aircraft, to determine if any of those alternate control surfaces can be used in conjunction with the rudder, or used independently, to meet the aircraft performance requirement. It will be apparent that method 100, as depicted in FIGS. 2-6, may be carried out repeatedly to evaluate several alternate control surfaces of the aircraft to assess what alternate control surface can be best used, alone or in conjunction with a main control surface, to meet a particular performance requirement.

Figure 7:
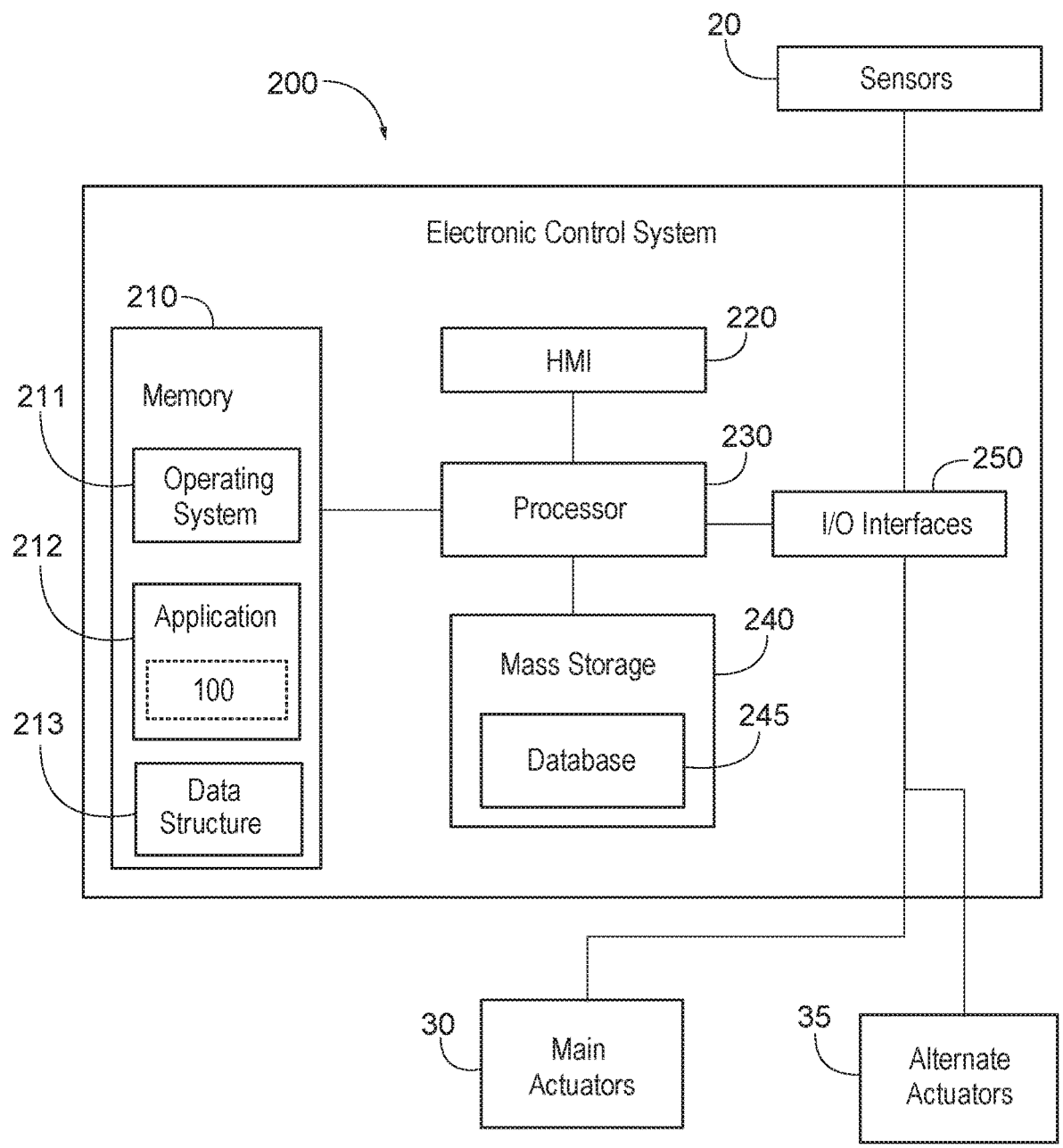
FIG. 7 is an exemplary schematic block diagram of an electronic control system of FIG. 1.

Referring now to FIG. 7, the method 100 described in FIGS. 2-6 above may be implemented on one or more electronic control systems such as exemplary electronic control system 200. The electronic control system 200 includes a processor 230, a memory 210, a mass storage memory device 240 that includes a database 245, one or more input/output (I/O) interfaces 250, and may include a Human Machine Interface (HMI) 220. The computer system 200 is operatively coupled to one or more sensors 20 of the aircraft 10, as depicted in FIG. 1, via an I/O interface 250.

The processor 230 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 210. Memory 210 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 240 includes data storage devices such as a hard drive, optical drive, tape drive, volatile or non-volatile solid state device, or any other device capable of storing information. The processor 230 operates under the control of an operating system 211 that resides in memory 210. The operating system 211 manages processing resources so that computer program code embodied as one or more computer software applications, such as an application 212 residing in memory 210, has instructions executed by the processor 230. In an alternative embodiment, the processor 230 executes the application 212 directly, in which case the operating system 211 may be omitted. One or more data structures 213 may also reside in memory 210, and may be used by the processor 230, operating system 211, or application 212 to store or manipulate data.

The I/O interface 250 provides a machine interface that operatively couples the processor 230 to other devices and systems, such as the sensors 20 and main actuators 30 and alternate actuators 40 of aircraft 10. The application 212, which includes data comprising program code for execution by processor 230 to perform method 100 as described above, thereby works cooperatively with the sensors 20, main actuators 30, alternate actuators 40, and other systems of aircraft 10 by communicating via the I/O interface 250 to provide the various features, functions, applications, processes, or modules comprising embodiments of the invention. The application 212 has program code that is executed by, for example, main actuators 30 and alternate actuators 40, or otherwise rely on functions or signals provided by other system or network components external to the electronic control system 200. Indeed, given the nearly endless hardware and software configurations possible, persons having ordinary skill in the art will understand that embodiments of the invention may include applications that are located externally to the electronic control system 200, distributed among multiple computers or other external resources, or provided by computing resources (hardware and software) that are provided externally to electronic control system 200.

The HMI 220, if included, is operatively coupled to the processor 230 of electronic control system 200 in a known manner to allow a user to interact directly with the electronic control system 200. The HMI 220 may include video or alphanumeric displays, a touch screen, a speaker, and any other suitable audio and visual indicators capable of providing data to the user. The HMI 220 may also include input devices and controls such as an alphanumeric keyboard, a pointing device, keypads, pushbuttons, control knobs, microphones, etc., capable of accepting commands or input from the user and transmitting the entered input to the processor 230.

A database 245 resides on the mass storage memory device 240, and may be used to collect and organize data used by the various systems and modules described herein. The database 245 may include data and supporting data structures that store and organize the data. In particular, the database 245 may be arranged with any database organization or structure including, but not limited to, a relational database, a hierarchical database, a network database, or combinations thereof. A database management system in the form of a computer software application executing as instructions on the processor 230 may be used to access the information or data stored in records of the database 245 in response to a query, where a query may be dynamically determined and executed by the operating system 211, other applications 212, or one or more modules. In particular, database 245 of electronic control system 200 may include control laws, such as main control laws for main control surfaces and alternate control laws for alternate control surfaces, as well as blended control laws for control of main control surfaces in conjunction with alternate control surfaces, as described above. Database 245 may also include one or more performance requirements for the aircraft. In embodiments, database 245 may also include main actuator performance models and alternate actuator performance models, as described further above, for main control surfaces and alternate control surfaces, respectively, of the aircraft 10. In embodiments, database 245 may also include main actuator difference thresholds for main actuators 30 and alternate actuator difference thresholds for alternate actuators 40, as described further above.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A method for controlling performance of an aircraft, the method comprising:
    obtaining, from an electronic control system of the aircraft, an aircraft performance requirement for the aircraft;
    obtaining, from one or more sensors of the aircraft, a set of aircraft flight data;
    obtaining main actuator performance data from a main actuator and alternate actuator performance data from an alternate actuator, the main actuator connected to and controlling a main control surface of the aircraft and the alternate actuator connected to and controlling an alternate control surface of the aircraft, wherein the main control surface is a control surface configured to perform a particular aircraft maneuver or operation, and the alternate control surface is configured to perform the particular aircraft maneuver or operation either alone or in conjunction with the main control surface;
    obtaining, from the electronic control system, a main control law for controlling the main actuator, an alternate control law for controlling the alternate actuator, and a blended control law for controlling the main actuator and the alternate actuator together;
    implementing the main control law in response to determining the main control surface meets the performance requirement independently;
    implementing the blended control law, based on the set of aircraft flight data and the alternate actuator performance data, when the main control surface is unable to independently meet the performance requirement and when the alternate control surface is configured to be used in conjunction with the main control surface; and
    implementing the alternate control law when the main control surface is unable to meet the performance requirement, when the alternate control surface is unable to be combined with the main control surface, and when the alternate control surface meets the aircraft performance requirement independently.

2. The method of claim 1, wherein the main actuator performance data includes measurements of one or more first forces acting on the main actuator or a rate or a position of the main actuator, the method further comprising:
    obtaining, from the electronic control system, a predicted main actuator performance model of the main control surface to determine a threshold, wherein implementing the main control law comprises comparing the main actuator performance data to the predicted main actuator performance model.

3. The method of claim 2, wherein the predicted main actuator performance model comprises a main actuator reference table, and wherein the comparing comprises:
    locating the set of aircraft flight data on the main actuator reference table to obtain first threshold values for the main actuator performance data; and
    comparing the main actuator performance data with the first threshold values, wherein the main control law is implemented when the main actuator performance data does not exceed the first threshold values.

4. The method of claim 3, wherein the alternate actuator performance data includes measurements of one or more second forces acting on the alternate actuator or the rate or position of the alternate actuator, the method further comprising:
    obtaining, from the electronic control system, a predicted alternate actuator performance model of the alternate control surface, the predicted alternate actuator performance model comprising an alternate actuator reference table;
    locating the set of aircraft flight data on the alternate actuator reference table to obtain second threshold values for the alternate actuator performance data; and
    comparing the alternate actuator performance data with the second threshold values, wherein the blended control law is implemented when the alternate actuator performance data does not exceed the second threshold values.

5. The method of claim 2, wherein the one or more first forces include one or more of a hinge moment, an actuation force magnitude, and an actuation force rate.

6. The method of claim 1, wherein the main actuator performance data includes a measurement of a difference between a target position and an actual position of the main actuator, the method further comprising:
    obtaining, from the electronic control system, a main actuator difference threshold, the main actuator difference threshold being a maximum allowed difference between the target position and the actual position of the main actuator; wherein implementing the main control law comprises comparing the main actuator performance data with the main actuator difference threshold, and wherein the main control law is implemented when the main actuator performance data does not exceed the main actuator difference threshold.

7. The method of claim 6, wherein the alternate actuator performance data includes a measurement of a difference between a target position and an actual position of the alternate actuator, the method further comprising:

obtaining, from the electronic control system, an alternate actuator difference threshold, the alternate actuator difference threshold being a maximum allowed difference between the target position and the actual position of the alternate actuator, wherein implementing the blended control law comprises comparing the alternate actuator performance data with the alternate actuator difference threshold, and wherein the blended control law is implemented when the alternate actuator performance data does not exceed the alternate actuator difference threshold and the blended control law prevents the main actuator performance data from exceeding the main actuator difference threshold.

8. The method of claim 1, further comprising automatically implementing the blended control law, before implementing the main control law, when the alternate control law is controlling the alternate control surface and the main control surface is independently used to meet the aircraft performance requirement.

9. The method of claim 1, wherein the alternate control surface is one alternate control surface of a plurality of alternate control surfaces, the alternate actuator is one alternate actuator of a plurality of alternate actuators, the alternate control law is one alternate control law of a plurality of alternate control laws, and the blended control law is one blended control law of a plurality of blended control laws, the method further comprising:

determining that the one alternate control surface is unable to be used in conjunction with the main control surface and is unable to meet the aircraft performance requirement independently, and obtaining another alternate control law for controlling another alternate actuator that controls another alternate control surface of the aircraft;

obtaining additional alternate actuator performance data from the other alternate actuator;

implementing the other blended control law, based on the set of aircraft flight data and the additional alternate actuator performance data, when the other alternate control surface is used in conjunction with the main control surface; and implementing the other alternate control law when the other alternate control surface is unable to be used in conjunction with the main control surface and when the other alternate control surface meets the aircraft performance requirement independently.

10. The method of claim 1, wherein the set of aircraft flight data includes one or more of an airspeed of the aircraft, an altitude of the aircraft, an orientation of the aircraft, a degree of freedom of the aircraft, and an acceleration of the aircraft.

11. A system for controlling performance of an aircraft, the system comprising:

one or more sensors capable of collecting a set of aircraft flight data;

a main control surface of the aircraft and an alternate control surface of the aircraft, the main control surface connected to and controlled by a main actuator, the alternate control surface connected to and controlled by an alternate actuator, wherein the main control surface is a control surface configured to perform a particular aircraft maneuver or operation, and the alternate control surface is configured to perform the particular aircraft maneuver or operation either alone or in conjunction with the main control surface; and an electronic control system, the electronic control system including one or more processors operatively connected to the one or more sensors, the main actuator, and the alternate actuator, a database operatively connected to the processor, and a memory operatively connected to the one or more processors and the database, the memory storing data comprising program code for execution by the one or more processors to perform a method, the method comprising:

obtaining, from the database, an aircraft performance requirement for the aircraft;

obtaining, from the one or more sensors, the set of aircraft flight data;

obtaining main actuator performance data from the main actuator and alternate actuator performance data from the alternate actuator;

obtaining, from the database, a main control law for controlling the main actuator, an alternate control law for controlling the alternate actuator, and a blended control law for controlling the main actuator and the alternate actuator together;

implementing the main control law in response to determining, based on the main actuator performance data and the set of aircraft flight data, the main control surface meets the aircraft performance requirement independently;

implementing the blended control law, based on the set of aircraft flight data and the alternate actuator performance data, in response to determining the main control surface is unable to meet the aircraft performance requirement and when the alternate control surface is used in conjunction with the main control surface; and implementing the alternate control law when the main control surface is unable to meet the aircraft performance requirement independently, when the alternate control surface is unable to be used in conjunction with the main control surface, and when the alternate control surface meets the aircraft performance requirement independently.

12. The system of claim 11, wherein the main actuator performance data includes measurements of one or more first forces acting on the main actuator, or the rate or position of the main actuator, the method further comprising:

obtaining, from the electronic control system, a predicted main actuator performance model of the main actuator/control surface, wherein implementing the main control law comprises comparing the main actuator performance data to the predicted main actuator performance model.

13. The system of claim 12, wherein the predicted main actuator performance model comprises a main reference table, and wherein the comparing comprises:

locating the set of aircraft flight data on the main reference table to obtain first threshold values for the main actuator performance data, and comparing the main actuator performance data with the first threshold values, wherein the main control law is implemented when the main actuator performance data does not exceed the first threshold values.

14. The system of claim 12, wherein the alternate actuator performance data includes measurements of one or more second forces acting on the alternate actuator or a rate or a position of the alternate actuator, the method further comprising:

obtaining, from the electronic control system, a predicted alternate actuator performance model of the alternate control surface, the predicted alternate actuator performance model comprising an alternate actuator reference table;
locating the set of aircraft flight data on the alternate actuator reference table to obtain second threshold values for the alternate actuator performance data; and
comparing the alternate actuator performance data with the second threshold values, wherein the blended control law is implemented when the alternate actuator performance data does not exceed the second threshold values.

15. The system of claim 12, wherein the one or more first forces include one or more of a hinge moment, an actuation force magnitude, and an actuation force rate.

16. The system of claim 12, wherein the main actuator performance data includes a measurement of a difference between a target position and an actual position of the main actuator, the method further comprising:
obtaining, from the electronic control system, a main actuator difference threshold, the main actuator difference threshold being a maximum allowed difference between the target position and the actual position of the main actuator, wherein implementing the main control law comprises comparing the main actuator performance data with the main actuator difference threshold, and wherein the main control law is implemented when the main actuator performance data does not exceed the main actuator difference threshold.

17. The system of claim 16, wherein the alternate actuator performance data includes a measurement of a difference between a target position and an actual position of the main actuator, the method further comprising:
obtaining, from the electronic control system, an alternate actuator difference threshold, the alternate actuator difference threshold being a maximum allowed difference between the target position and the actual position of the alternate actuator, wherein implementing the blended control law comprises comparing the alternate actuator performance data with the alternate actuator difference threshold, and wherein the blended control law is implemented when the alternate actuator performance data does not exceed the alternate actuator difference threshold and the blended control law prevents the main actuator performance data from exceeding the main actuator difference threshold.

18. The system of claim 11, wherein the method further comprises automatically implementing the blended control law, before implementing the main control law, when the alternate control law is controlling the alternate control surface and the main control surface meets the aircraft performance requirement independently.

19. The system of claim 11, wherein the alternate control surface is one alternate control surface of a plurality of alternate control surfaces, the alternate actuator is one alternate actuator of a plurality of alternate actuators, the alternate control law is one alternate control law of a plurality of alternate control laws, and the blended control law is one blended control law of a plurality of blended control laws, the method further comprising:
in response to determining the one alternate control surface is unable to combine with the main control surface to meet the aircraft performance requirement, obtaining another alternate control law for controlling another alternate actuator that controls another alternate control surface of the aircraft;
obtaining additional alternate actuator performance data from the other alternate actuator;
implementing the other blended control law, based on the set of aircraft flight data and the additional alternate actuator performance data, when the other alternate control surface is used in conjunction with the main control surface; and
implementing the other alternate control law when the other alternate control surface is unable to combine with the main control surface and when the other alternate control surface independently meets the aircraft performance requirement.

20. An aircraft comprising:
one or more sensors configured to collect a set of aircraft flight data;
a main control surface of the aircraft and an alternate control surface of the aircraft, the main control surface connected to and controlled by a main actuator, the alternate control surface connected to and controlled by an alternate actuator, wherein the main control surface is a control surface configured to perform a particular aircraft maneuver or operation, and the alternate control surface is configured to perform the particular aircraft maneuver or operation either alone or in conjunction with the main control surface; and
an electronic control system, the electronic control system including one or more processors operatively connected to the one or more sensors, the main actuator, and the alternate actuator, a database operatively connected to the processor, and a memory operatively connected to the one or more processors and the database, the memory storing data comprising program code for execution by the one or more processors to perform a method, the method comprising:
obtaining, from the database, an aircraft performance requirement for the aircraft;
obtaining, from the one or more sensors, the set of aircraft flight data;
obtaining main actuator performance data from the main actuator and alternate actuator performance data from the alternate actuator;
obtaining, from the database, a main control law for controlling the main actuator, an alternate control law for controlling the alternate actuator, and a blended control law for controlling the main actuator and the alternate actuator together;
implementing the main control law in response to determining, based on the main actuator performance data and the set of aircraft flight data, the main control surface meets the aircraft performance requirement independently;
implementing the blended control law, based on the set of aircraft flight data and the alternate actuator performance data, when the main control surface is unable to meet the aircraft performance requirement independently and when the alternate control surface is used in conjunction with the main control surface; and
implementing the alternate control law when the main control surface is unable to meet the aircraft performance requirement, when the alternate control surface is unable to be used in conjunction with the main control surface, and when the alternate control surface meets the aircraft performance requirement independently.

21. A method for controlling performance of an aircraft, the method comprising:

obtaining, from an electronic control system of the aircraft, an aircraft performance requirement for the aircraft;

obtaining, from one or more sensors of the aircraft, a set of aircraft flight data;

obtaining main actuator performance data from a main actuator and alternate actuator performance data from an alternate actuator, the main actuator connected to and controlling a main control surface of the aircraft and the alternate actuator connected to and controlling an alternate control surface of the aircraft, wherein the main actuator performance data includes measurements of one or more first forces acting on the main actuator or a rate or a position of the main actuator;

obtaining, from the electronic control system, a main control law for controlling the main actuator, an alternate control law for controlling the alternate actuator, and a blended control law for controlling the main actuator and the alternate actuator together;

implementing the main control law in response to determining the main control surface meets the performance requirement independently;

implementing the blended control law, based on the set of aircraft flight data and the alternate actuator performance data, when the main control surface is unable to independently meet the performance requirement and when the alternate control surface is configured to be used in conjunction with the main control surface, wherein the alternate actuator performance data includes measurements of one or more second forces acting on the alternate actuator or the rate or position of the alternate actuator;

implementing the alternate control law when the main control surface is unable to meet the performance requirement, when the alternate control surface is unable to be combined with the main control surface, and when the alternate control surface meets the aircraft performance requirement independently;

obtaining, from the electronic control system, a predicted main actuator performance model of the main control surface to determine a threshold, wherein implementing the main control law comprises comparing the main actuator performance data to the predicted main actuator performance model, wherein the predicted main actuator performance model comprises a main actuator reference table;

locating the set of aircraft flight data on the main actuator reference table to obtain first threshold values for the main actuator performance data;

comparing the main actuator performance data with the first threshold values, wherein the main control law is implemented when the main actuator performance data does not exceed the first threshold values;

obtaining, from the electronic control system, a predicted alternate actuator performance model of the alternate control surface, the predicted alternate actuator performance model comprising an alternate actuator reference table;

locating the set of aircraft flight data on the alternate actuator reference table to obtain second threshold values for the alternate actuator performance data; and comparing the alternate actuator performance data with the second threshold values, wherein the blended control law is implemented when the alternate actuator performance data does not exceed the second threshold values.

22. A system for controlling performance of an aircraft, the system comprising:

one or more sensors capable of collecting a set of aircraft flight data;

a main control surface of the aircraft and an alternate control surface of the aircraft, the main control surface connected to and controlled by a main actuator, the alternate control surface connected to and controlled by an alternate actuator; and an electronic control system, the electronic control system including one or more processors operatively connected to the one or more sensors, the main actuator, and the alternate actuator, a database operatively connected to the processor, and a memory operatively connected to the one or more processors and the database, the memory storing data comprising program code for execution by the one or more processors to perform a method, the method comprising:

obtaining, from the database, an aircraft performance requirement for the aircraft;

obtaining, from the one or more sensors, the set of aircraft flight data;

obtaining main actuator performance data from the main actuator and alternate actuator performance data from the alternate actuator, wherein the main actuator performance data includes measurements of one or more first forces acting on the main actuator, or the rate or position of the main actuator, and wherein the alternate actuator performance data includes measurements of one or more second forces acting on the alternate actuator or a rate or a position of the alternate actuator;

obtaining, from the database, a main control law for controlling the main actuator, an alternate control law for controlling the alternate actuator, and a blended control law for controlling the main actuator and the alternate actuator together;

implementing the main control law in response to determining, based on the main actuator performance data and the set of aircraft flight data, the main control surface meets the aircraft performance requirement independently;

implementing the blended control law, based on the set of aircraft flight data and the alternate actuator performance data, in response to determining the main control surface is unable to meet the aircraft performance requirement and when the alternate control surface is used in conjunction with the main control surface;

implementing the alternate control law when the main control surface is unable to meet the aircraft performance requirement independently, when the alternate control surface is unable to be used in conjunction with the main control surface, and when the alternate control surface meets the aircraft performance requirement independently;

obtaining, from the electronic control system, a predicted main actuator performance model of the main actuator/control surface, wherein implementing the main control law comprises comparing the main actuator performance data to the predicted main actuator performance model;

obtaining, from the electronic control system, a predicted alternate actuator performance model of the alternate control surface, the predicted alternate actuator performance model comprising an alternate actuator reference table;

locating the set of aircraft flight data on the alternate actuator reference table to obtain second threshold values for the alternate actuator performance data; and comparing the alternate actuator performance data with the second threshold values, wherein the blended control law is implemented when the alternate actuator performance data does not exceed the second threshold values.

23. The method of claim 1, wherein the main control surface is an elevator, a rudder, and or more ailerons, and the alternate control surface is a flap, a spoiler, a slat, a slot, or a brake.

\* \* \* \* \*